(12) United States Patent
Urbach

(10) Patent No.: US 10,109,101 B2
(45) Date of Patent: Oct. 23, 2018

(54) RE-UTILIZATION OF RENDER ASSETS FOR VIDEO COMPRESSION

(71) Applicant: Julian Michael Urbach, Los Angeles, CA (US)

(72) Inventor: Julian Michael Urbach, Los Angeles, CA (US)

( * ) Notice: Subject to any disclaimer, the term of this patent is extended or adjusted under 35 U.S.C. 154(b) by 0 days.

(21) Appl. No.: 15/850,455

(22) Filed: Dec. 21, 2017

(65) Prior Publication Data

US 2018/0114356 A1 Apr. 26, 2018

Related U.S. Application Data

(63) Continuation of application No. 14/622,047, filed on Feb. 13, 2015, now Pat. No. 9,865,081, which is a continuation of application No. 13/683,124, filed on Nov. 21, 2012, now Pat. No. 8,957,946, which is a continuation of application No. 12/484,462, filed on Jun. 15, 2009, now Pat. No. 8,319,825.

(60) Provisional application No. 61/061,904, filed on Jun. 16, 2008.

(51) Int. Cl.
*G06T 15/08* (2011.01)
*G06T 15/00* (2011.01)
*H04N 19/46* (2014.01)
*H04N 19/597* (2014.01)

(52) U.S. Cl.
CPC ............ *G06T 15/08* (2013.01); *G06T 15/005* (2013.01); *H04N 19/46* (2014.11); *H04N 19/597* (2014.11); *G06T 2200/16* (2013.01)

(58) Field of Classification Search
CPC ... G06T 15/005; G06T 15/08; G06T 2200/16; H04N 19/46; H04N 19/597
See application file for complete search history.

(56) References Cited

U.S. PATENT DOCUMENTS

| | | | |
|---|---|---|---|
| 7,218,323 B1 | 5/2007 | Halmshaw et al. |
| 8,232,989 B2 | 7/2012 | Hyndman |
| 8,553,028 B1 | 10/2013 | Urbach |
| 8,817,025 B1 | 8/2014 | Urbach |
| 9,214,038 B1 | 12/2015 | Urbach |
| 9,659,400 B2 | 5/2017 | Urbach |
| 2005/0185711 A1 | 8/2005 | Pfister et al. |
| 2006/0247046 A1 | 11/2006 | Choi et al. |
| 2008/0158232 A1 | 7/2008 | Shuster |

*Primary Examiner* — Anner N Holder
(74) *Attorney, Agent, or Firm* — James J. DeCarlo; Greenberg Traurig, LLP

(57) ABSTRACT

Methods, apparatuses and systems directed to using viewport state data objects (VSDO) to render a series of video frames according to render instructions to achieve video compression. In a particular implementation, the video compression format exposes the VSDO and render instructions to a video render client, allowing the video render client to finish rendering a sequence of video frames from different spatial locations and view transform parameters. Implementations of this video compression format further allow any arbitrary client with enough graphics processing power and bandwidth to retransmit novel, completely rendered viewports to thin clients without taxing the root remote render devices.

21 Claims, 7 Drawing Sheets

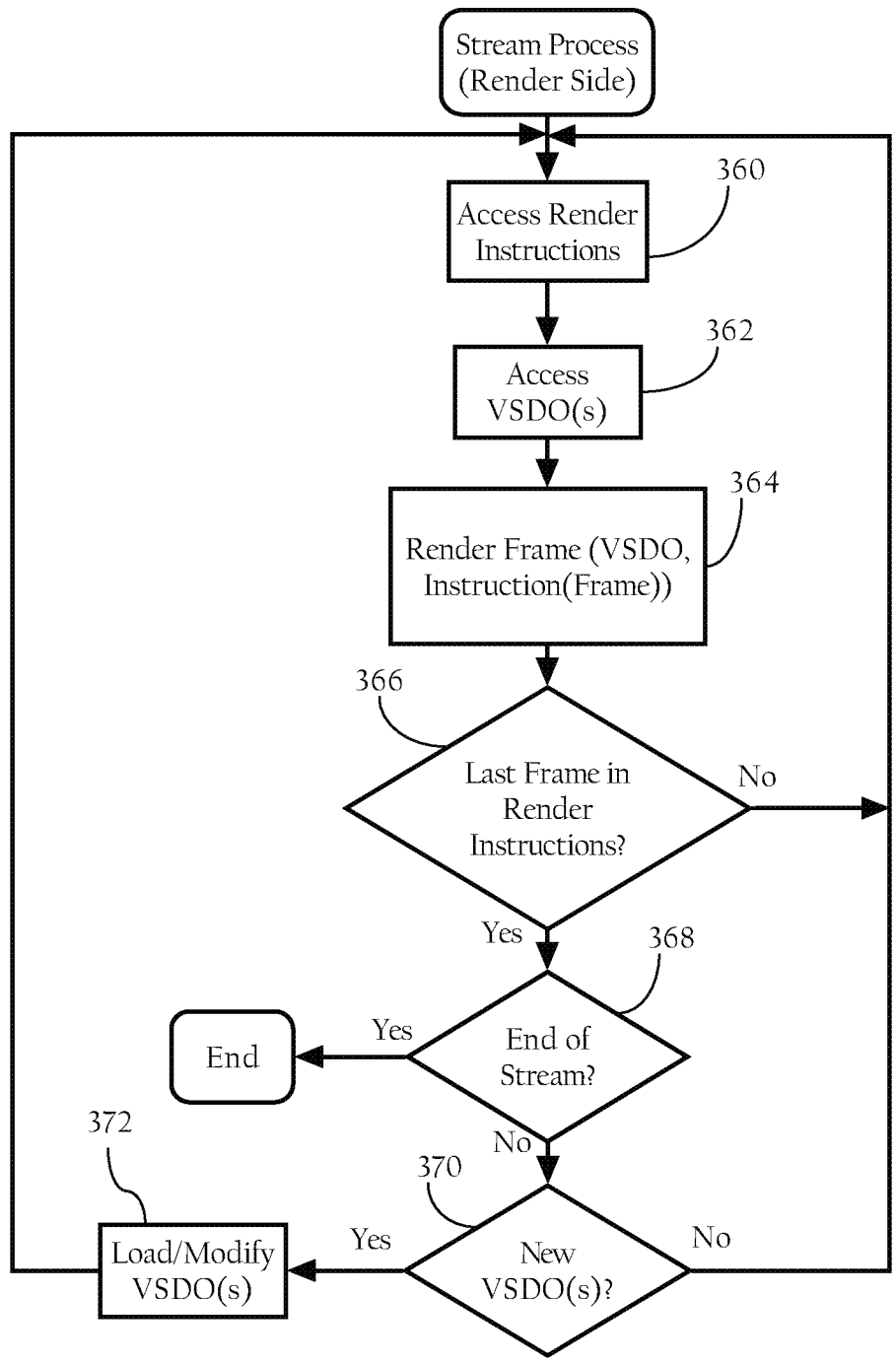
FIG._3B

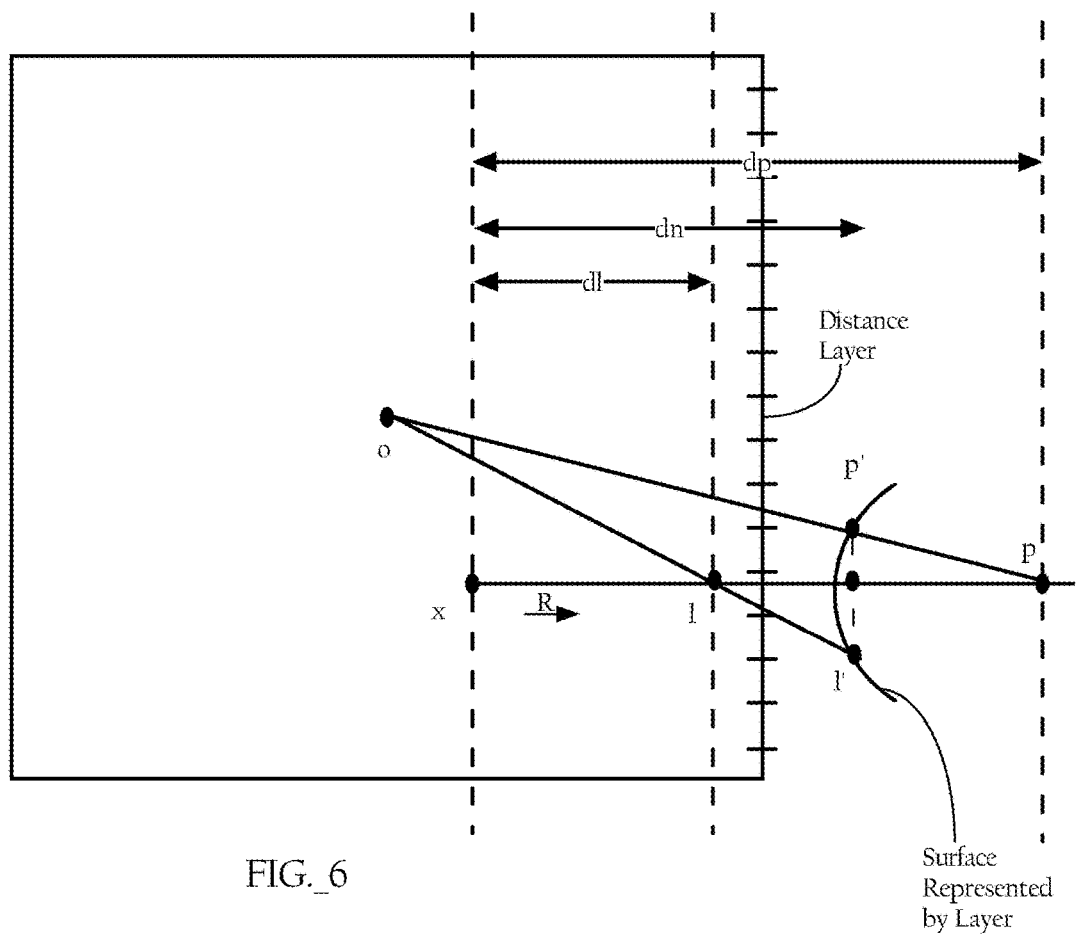
FIG._6

RE-UTILIZATION OF RENDER ASSETS FOR VIDEO COMPRESSION

CROSS-REFERENCE TO RELATED APPLICATION

The present application is a continuation of and claims priority from U.S. patent application Ser. No. 14/622,047, filed on Feb. 13, 2015, entitled "RE-UTILIZATION OF RENDER ASSETS FOR VIDEO COMPRESSION," which is a continuation of U.S. Non-provisional application Ser. No. 13/683,124 now U.S. Pat. No. 8,957,946 which is a continuation of U.S. Non-Provisional application Ser. No. 12/484,462 filed Jun. 15, 2009, now U.S. Pat. No. 8,319,825 which claims priority to U.S. Provisional Application Ser. No. 61/061,904 filed Jun. 16, 2008. The entireties of these applications are incorporated by reference herein for all purposes.

TECHNICAL FIELD

The present disclosure generally relates to graphics rendering and video compression.

BACKGROUND

Video compression refers to reducing the quantity of data used to represent video images and often combines image compression and motion compensation. A video codec is a device or software that enables video compression and/or decompression for digital video. Traditionally, video codecs apply various spatial and temporal transforms (such as discrete cosine transforms and the like) on the two-dimensional frames that make up a video sequence in order to reduce the raw data that must be stored on a storage medium or transmitted across a network.

Computer graphics research has explored a variety of techniques for the creation of realistic, yet simulated, images. In this context, a realistic image would be an image substantially approximating a photograph of a real, three-dimensional scene. As research has progressed, the continual inclusion of more and more features of real scenes within image generation algorithms (features such as opacity, surface textures, soft shadows) has led to increasingly realistic images. One of the first successful image synthesis approaches, called ray tracing, started with the basic physics of lens design. Ray tracing involves determining the path taken by rays of light starting at a light source, which then pass through a hypothetical lens to a focal point. The process of following the light rays is called ray tracing. When initially developed, the method of ray tracing was computationally intensive and impractical for existing computer resources. As increasingly powerful and inexpensive computers evolved, however, ray tracing algorithms received greater attention. Simulating the actual physics of image generation, through substantial numbers of calculations, became practical and attractive for image synthesis. The methods of ray-tracing algorithms have been augmented with powerful techniques for handling many different kinds of optical phenomena.

Ray tracing starts with a few basic elements: a three-dimensional scene lit by one or more light sources, a viewing screen comprising an array of pixel elements (a window onto the scene), and a hypothetical viewing eye which looks out on the scene through the viewing screen. The goal of any image synthesis technique is to correctly color each pixel of the viewing screen such that looking at the screen from the vantage of the hypothetical eye would recreate the original three-dimensional scene as closely as possible.

As generally implemented, ray tracing is backward ray tracing, whereby a backward-going ray from the hypothetical viewing eye passes through a pixel on the viewing screen and strikes an object within the scene to be rendered. By working backwards, a rendering algorithm essentially determines the point on a surface where a light ray has struck and then determines from where the light ray originated. Having found the first surface which the backward ray struck, the rendering algorithm determines all light striking that point on that surface and how the incident light is affected by the particular surface characteristics of the struck object. The combined light illumination of the object can be passed back along the original ray through the particular pixel into the viewer's eye, allowing the pixel to be appropriately shaded. Of course, the different intensities, directions, colors and origins of the light striking the point on the object's surface is infinite; path tracing seeks to sample the light coming from different sources efficiently so that a few samples can replace exhaustively looking at all light rays, while still recovering enough useful information to construct a close estimate of the scene's photometry.

SUMMARY

In particular embodiments, the present invention provides methods, apparatuses and systems directed to using viewport state data objects (VSDOs) to render a series of video frames according to render instructions received from a remote host to achieve video compression. In a particular implementation, the video compression format exposes the VSDO and render instructions to a video render client, allowing the video render client to finish rendering a sequence of video frames from different spatial locations and view transform parameters. Implementations of this video compression format further allow any arbitrary client with enough graphics processing power and bandwidth to retransmit novel, completely rendered viewports to thin clients without taxing the root remote render devices.

Rather than receive each video frame naively, a video rendering client application can be configured to receive one or more VSDOs and rendering instructions and render, based on the instructions, a sequence of video frames using the information contained in the one or more VSDOs. In some implementations, frame rendering may require only a fragment operation per rendered screen pixel. For example, this would allow a remote video distribution system to generate a set of VSDOs (either on the fly or as a pre-processing step) and corresponding frame rendering instructions for a video sequence, and transmit the VSDOs and the frame rendering instructions to one or more video render clients. This video data can be streamed to the video client, transmitted in a bulk download, or stored on a computer-readable media, such as an optical disk or hard drive.

DESCRIPTION OF THE DRAWINGS

FIGS. 3A and 3B are flow charts illustrating example process flows according to one possible implementation of the invention.

FIGS. 4 thru 6 are diagrams that graphically illustrate how rays can be traced from an arbitrary spatial location within a cube map where distances are defined relative to a common reference point.

DESCRIPTION OF EXAMPLE EMBODIMENT(S)

The following example embodiments are described and illustrated in conjunction with apparatuses, methods, and systems which are meant to be illustrative, not limiting in scope.

A Overview

A.1. Network Environment

Figure 1:
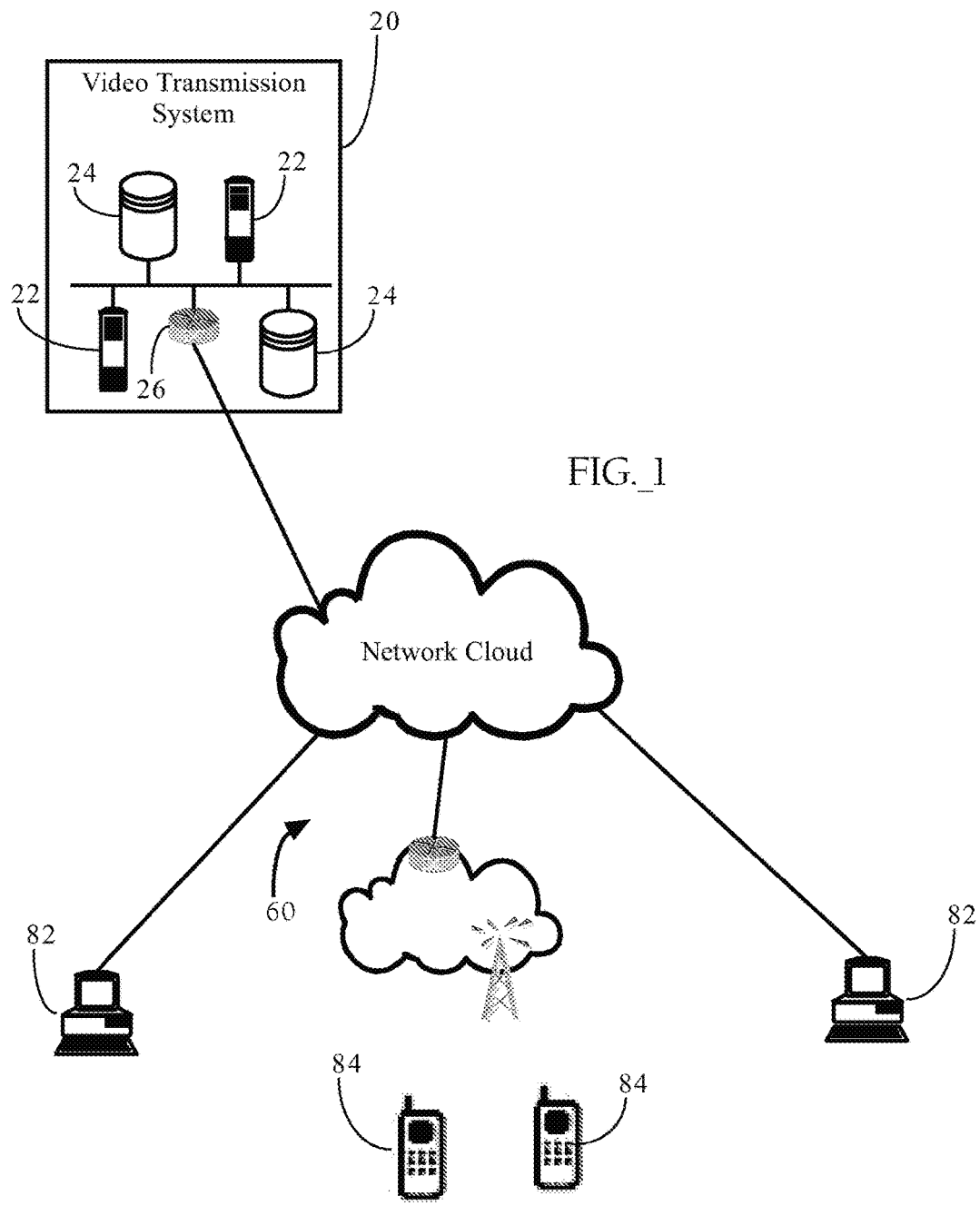
FIG. 1 is a schematic diagram illustrating a computer network environment in which implementations of the invention may operate.

FIG. 1 illustrates an example network environment in which particular implementations of the invention may operate. As FIG. 1 illustrates, particular implementations of the invention may operate in a network environment comprising a video transmission system 20 that is operatively coupled to a network cloud 60, which may include the Internet. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like. Some of the networks in network cloud 60 may be circuit-switched networks. The computer network environment, including network 60 can be a packet-based communications environment, employing TCP/IP protocols (for example), and/or other suitable protocols, and has a plurality of interconnected digital packet transmission stations or routing nodes. Client nodes 82 and 84 are operably connected to the network environment via a network service provider or any other suitable means. Client nodes 82 and 84 may include personal computers or cell phones, as well as other types of mobile devices such as lap top computers, personal digital assistants (PDAs), etc.

Video transmission system 20 is a network addressable system that hosts one or more videos (either as streams or bulk downloads) accessible to one or more users over a computer network. The video transmission system 20 may include web site and server functionality where users may request and receive identified web pages, video and other content over the computer network.

In particular implementations, video transmission system 20 comprises one or more physical servers 22 and one or more data stores 24. The one or more physical servers 22 are operably connected to computer network 60 via a router 26. The one or more physical servers 22 host functionality that allows users to browse available content, such as receiving requests from, and transmitting responsive data to, client nodes 82 and 84. In one implementation, the functionality hosted by the one or more physical servers may include web or HyperText Transport Protocol (HTTP) servers, Real Time Streaming Protocol (RTSP) servers, and the like.

Physical servers 22, as discussed above, host functionality directed to supporting and implementing video transmission system 20. In a particular implementation, the physical servers 22 may host one or more instances of a video streaming (e.g., RTSP) server and one or more instances of a remote rendering device server. In one implementation, a data store 24 may store video content such as digital content data objects, user information, and other media assets. A content data object or a content object, in particular implementations, is an individual item of digital information typically stored or embodied in a data file, binary large object (BLOB) or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects, object or asset definitions, and the like. Structurally, content data store 24 connotes a large class of data storage and management systems. In particular implementations, content data store 24 may be implemented by any suitable physical system including components, such as database servers, mass storage media, media library systems, and the like.

A.2. Example Computing System Architecture

The server and client host systems described herein may be implemented in a wide array of computing systems and architectures. The following describes example computing architectures for didactic, rather than limiting, purposes.

Figure 2:
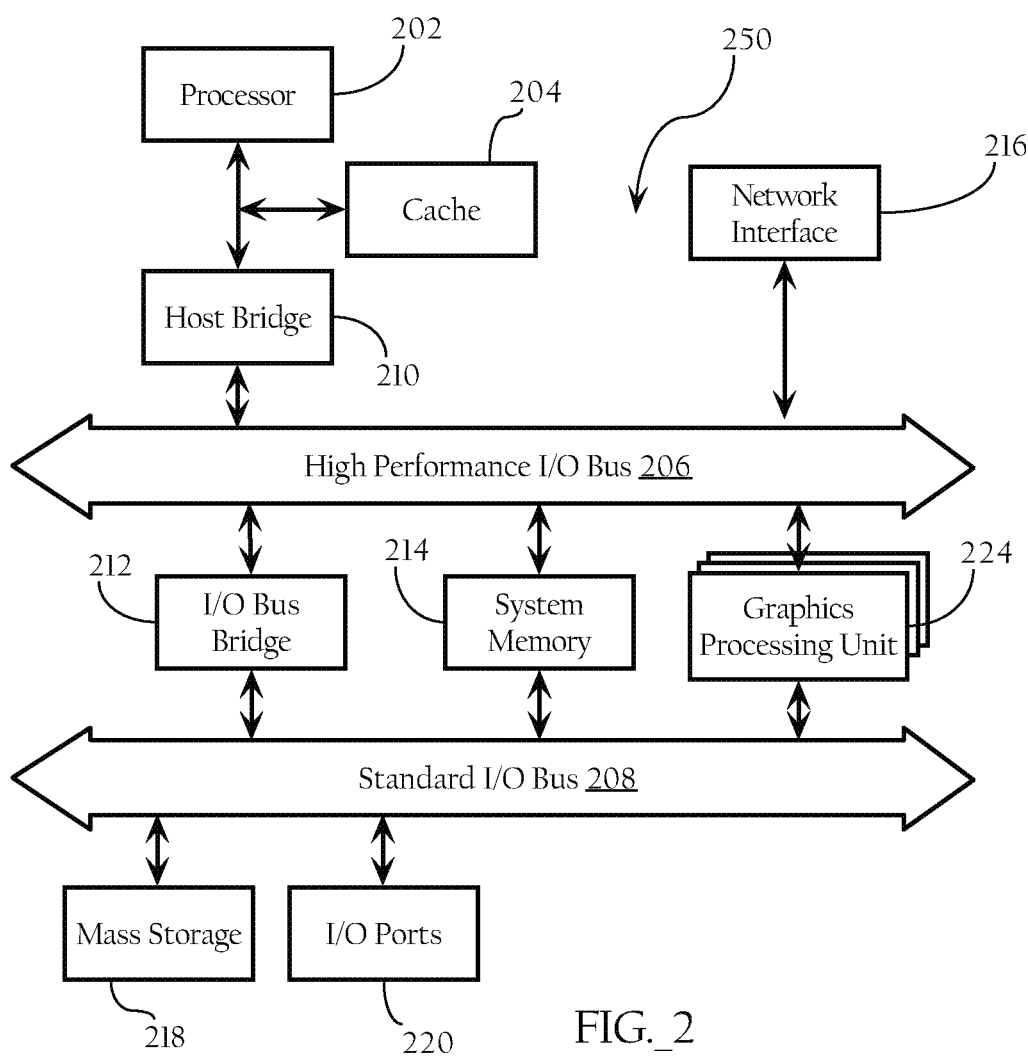
FIG. 2 is an example server system architecture according to one possible implementation of the invention.

FIG. 2 illustrates an example computing system architecture, which may be used to implement a physical server or client computing system. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. For physical servers and clients hosting video compression functionality, hardware system 200 may further include one or more graphics processing units 224 coupled to buses 206 and 208. In one implementation, the graphics processing unit 224 may be embodied in a graphics or display card that attaches to the hardware system architecture via a card slot. In other implementations, the graphics processor unit 224 may be integrated on the motherboard of the server system architecture.

Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the location server 22, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments, only a single bus may exist, with the components of hardware system 200 being coupled to the single bus. Furthermore, hardware system 200 may include additional components, such as additional processors, storage devices, or memories.

Graphics processing unit 224, in one implementation, comprises one or more integrated circuits and/or processing cores that are directed to mathematical operations commonly used in graphics rendering. In some implementations, the GPU 224 may use a special graphics unit instruction set, while in other implementations, the GPU may use a CPU-like (e.g. a modified x86) instruction set. Graphics processing unit 224 can implement a number of graphics primitive operations, such as blitting, texture mapping, pixel shading, frame buffering, and the like. Graphics processing unit 324 may be a graphics accelerator, a GPGPU (General Purpose GPU), or any other suitable processing unit.

As discussed below, in one implementation, the operations of one or more of the physical servers and clients described herein are implemented as a series of software routines run by hardware system 200. These software routines comprise a plurality or series of instructions to be executed by a processor in a hardware system, such as processor 202. Initially, the series of instructions may be stored on a storage device or other computer readable medium, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP/Vista operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. Of course, other implementations are possible. For example, the server functionalities described herein may be implemented by a plurality of server blades communicating over a backplane.

Additionally, video render clients may be hosted on the same or similar hardware architectures. For example, client computer 82 may include a GPU which loads one or more VSDOs transmitted by video transmission system 20 into GPU memory, and renders one or more frames of a video sequence according to render instructions corresponding to the VSDOs. In other implementations, some or all of the video de-compression operations may also be performed in system memory using a general purpose computing architecture as well.

B. Frame Rendering Processes

A video frame is a rendered representation of a scene or environment from a given spatial location in the environment and according to one or more view transform parameters (such as translation, pitch, yaw, and field of view). A video sequence can be generated by successively generating video frames from one or more VSDOs according to a set of render instructions. A given video frame can be rendered by generating a VSDO, which in one implementation comprises a layered cube map, and by using a pixel or fragment shader to generate pixel values for the frame.

A cube map is essentially six texture maps stitched into a cube. A dynamic cube map texture can be generated by first rendering the scene six times from a common origin according to different views. Each view is a different orthogonal 90 degree view frustum corresponding to one of the six faces of the texture map. Each texture map includes texels, which are pixel information regarding a scene relative to a common reference point. A texture map on the face of a cube can be generated by rendering a scene from a common reference point using the faces of the cube as window rectangles. Each texel may contain material properties (index of refraction, color, etc.), the distance from the reference point, and a surface normal vector. A set of layered texture maps representing a scene can be obtained using depth peeling. The number of peeling passes can be limited to control the number of layers. VSDOs can be initially generated on a rendering device on-the-fly or stored for subsequent transmission in response to a request for a video. A rendering device can efficiently generate a VSDO on a GPU, using cube maps and multiple render targets with depth peeling or some other suitable process. These VSDO render assets can then be stored for later use, such as transmission to a remote video render client or storage on a computer readable medium, such as an optical disk, along with frame rendering instructions.

Each texel in a layered texel array (comprised of depth-sorted layers of a scene) stores information on object points between the reference point and the farthest object point within the depth peeling layer of the texel. To generate a rendered representation of a scene corresponding to a layered cube map, a video render client including graphics processing functionality, such as a GPU, may trace rays from a common origin to determine the distances between the origin and objects in the scene, using a fragment shader unit to compute the radiance at points visible from the origin. The render processing typically involves rasterizing the scene geometry and finding the first hits from where the rays extending from the origin pass through the pixels.

The system and the methods described herein can be configured to allow a video render client to efficiently re-use VSDOs to render a plurality of frames in a video sequence to essentially achieve a novel video compression scheme. For example, video compression can be achieved by creating one or more VSDOs and render instructions for a video sequence comprising a plurality of video frames. Using these render instructions, a video rendering client can generate a sequence of video frames by continuously updating at a desired frame rate, rendered representations of the VSDOs according to the render instructions.

The render instructions allow a video render client to render a sequence of video frames based on the same set of VSDOs. To that end, the render instructions may include the spatial location and view transform parameters that are to be used to render a video frame or a sequence of video frames. The render instructions for a given video frame may comprise a frame identifier, one or more VSDO identifiers, a spatial location, one or more view transform parameters, and the locations of one or more VSDOs relative to other VSDOs. Render instructions may comprise a variety of other rendering parameters including exposure or lighting control, film grain, depth of field, lens effects (e.g., glint, etc.), vignetting, lens warping, chromatic aberration, and other available camera and lens processing effects supported by a video render client.

The video compression scheme described herein thus allows the computing resources required to create Viewport State Data Objects, and the bandwidth resources consumed to transmit it, to essentially be re-used in connection with rendering multiple frames of a video sequence.

A VSDO, as discussed above, contains a set of rendered layers of a cube map that are initially rasterized by a render device, via depth peeling (in one implementation), where each layer of the rendered data segment contains depth information of a scene from a common reference point, material properties and optionally high dynamic range lighting values. This data encompasses enough information about the scene so that a video rendering client can quickly create a sequence of video frames, using the methods described herein, and stream them out as a digital video data stream formatted according to a video codec standard to additional peers clients and/or display them on a locally-attached display device.

As the spatial location from which a video frame is to be rendered varies from the reference point of the VSDO(s), a hit function can be used to trace rays from the spatial location corresponding to the video frame to the objects in the scene defined by the VSDO. The video frame rendering functionality described herein uses the search algorithms described below to render views of a scene using one or more common VSDOs rendered from different spatial location and view transform parameters. That is, using the HIT function defined below, a single VSDO or set of VSDOs can be used to render multiple frames, each with a different spatial location (or reference point) and different view transform parameters (such as pitch and yaw) from the origin(s) or reference point(s) used to generate the VSDO(s).

To render a scene, a fragment shader computes the distance between the spatial location corresponding to a video frame and an object defined in the layer(s) of the cube map along a set of rays extending from the spatial location of the video frame. Since the spatial location of the video frame and the reference point of the cube map are often different, a search algorithm is used to find the distance for rendering of a given pixel. As described below, a two-phased search algorithm can be used. In a first phase, a linear search algorithm is used to compute a rough overshooting guess and an undershooting approximation that bound the intersection point of the ray. A second search process, bounded by the overshooting and undershooting values, searches for a more accurate intersection point.

B.1. HIT Function

Figure 4:
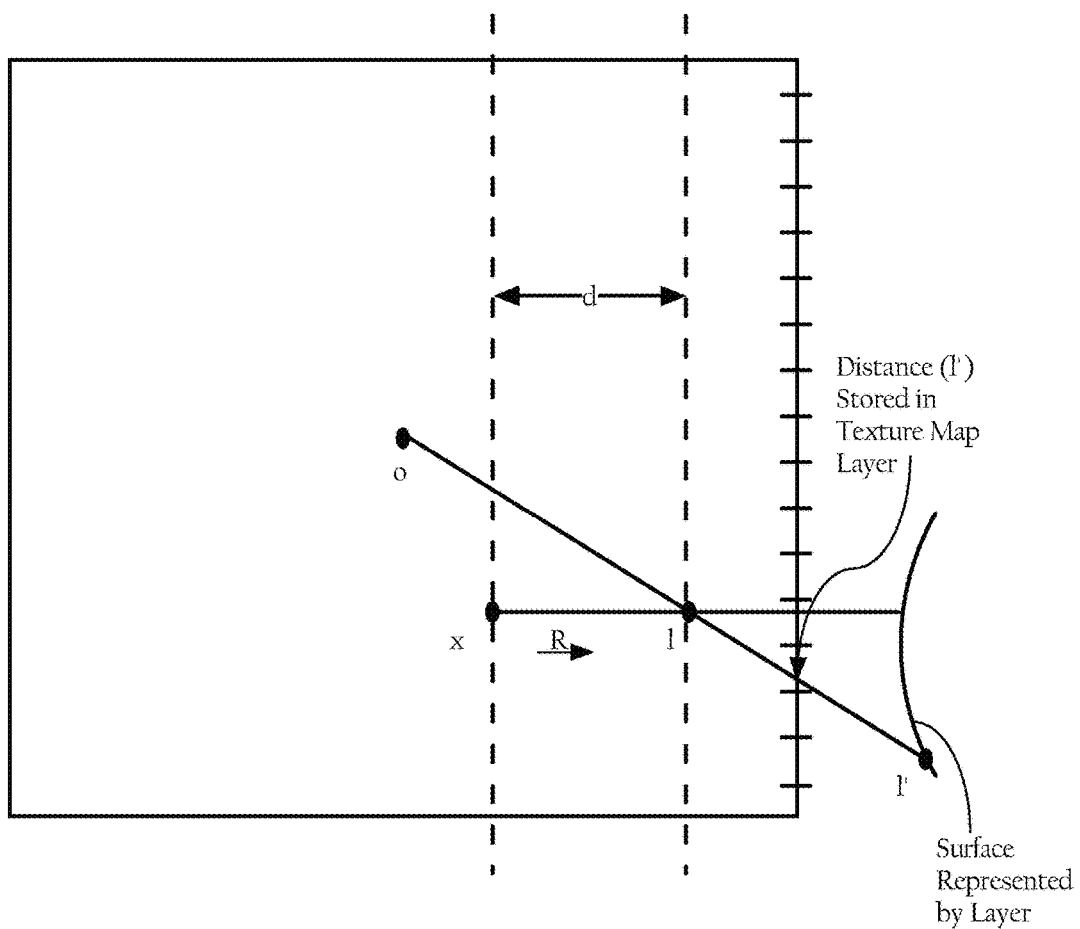
Figure 5:
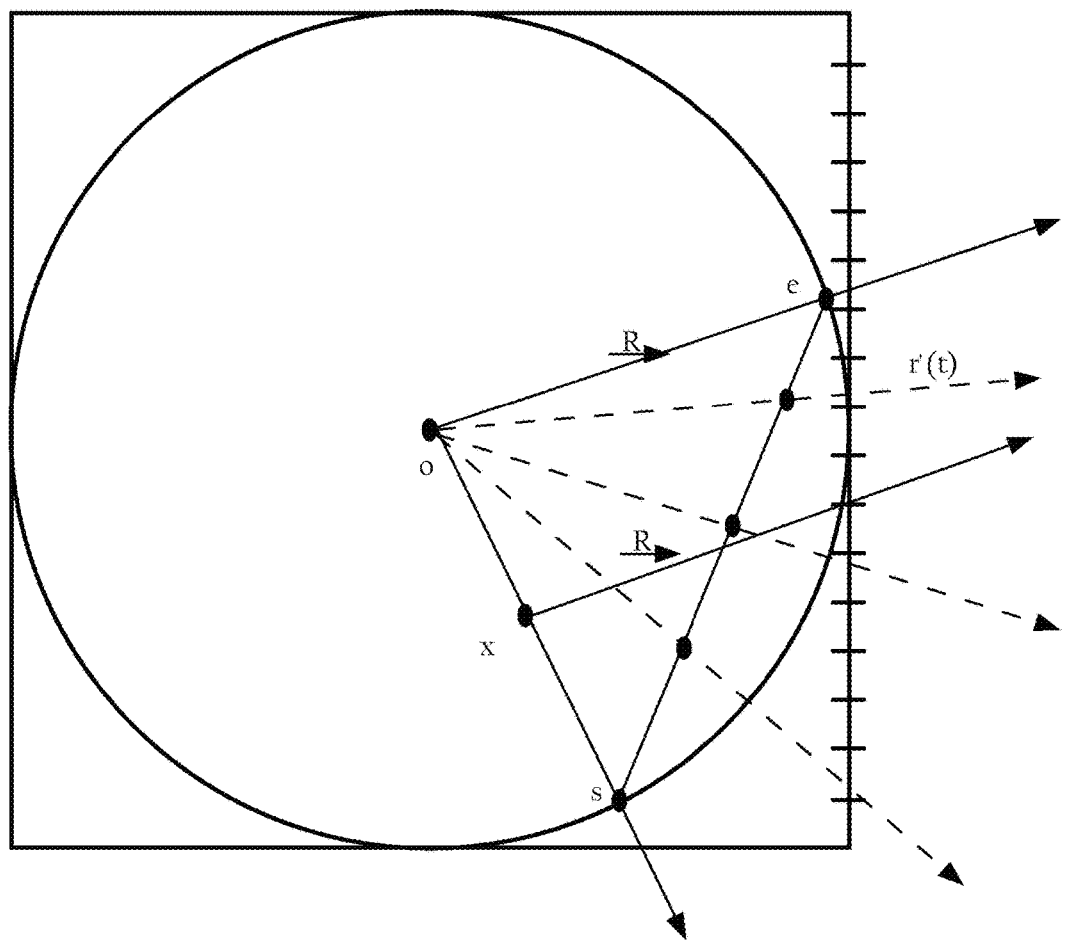

With reference to FIGS. 4 to 6, assume for didactic purposes, that point o is the reference point of the layered cube map of a VSDO, and the point x is the current spatial location from which a video frame is to be rendered. The distance d from point x to the first object intersection in a given layer can be defined by a ray of the equation $x+R*d$, where R is the direction of the ray. However, for a ray extending from point x in the direction R, it is necessary to search for the distance d given that the distances in the cube map are computed relative to the reference point o, and not the spatial location of the video frame (x). Referring to FIG. 4, the distance d can be approximated by reading the distance (P) of the surface represented by the cube map layer with the direction of $1=x+R*d$, and comparing it with the distance of the approximating point 1 on the ray 111. If 111 is approximately equal to I P I , then the intersection is found. However, if the point on the ray (1) is in front of the surface (III<IPI), then the current approximation is undershooting. If the point on the ray (1) is beyond the surface (III>IPI), then the current approximation is overshooting. In a linear search process, a rough overshooting and undershooting approximation is computed. Within these approximations, a second more accurate search is conducted to find the ray end point or object intersection.

In a particular implementation, since the possible intersection points are on the ray defined by $x+R*d$, the search for the intersection or distance d can be conducted by checking points $r(d)=x+R*d$ with an increasing sequence of positive values of d, and detecting the first pair of subsequent or adjacent points, where one point of the pair overshoots and the second point undershoots. The actual intersection lies within these points.

The linear search, in one implementation, can involve marching on a line segment that looks the same as the ray from the reference point, except that its two endpoints are at the same distance. The endpoints of this line segment can be obtained by projecting the start of the ray, r(0), and the end of the ray, r(00), onto a unit sphere, resulting in a first endpoint $s=x/I$ x I and second endpoint $e=RI$ I R I . The intersection is found at the texels that are seen at a direction between s and e, as shown in FIG. 5.

The intersection algorithm can search these texels, making uniform steps along the line segment s-e, where $r'(t)=s*(1-t)+e*t$ for t=0, At, 2At, . . . , 1. The correspondence between ray parameter d and parameter t can be found by projecting r' onto the ray, which leads to $d(t)=(IxI/IRI)*t/(1-t)$. A fragment shader can take inputs of ray origin x (the spatial location of the video frame), direction R, and the cube map, and sequentially generate ray parameters d on points of the ray r and return an undershooting ray parameter dl and an overshooting ray parameter dp. The variables llp and ppp in the following fragment shader code listing represent ratios |1l/1l'| and |pl/lp'| respectively.

```
float a = length(x) / length (R);
bool undershoot = false, overshoot = false;
float dl, 11p; //Ray parameter and |1l/1l'| of last undershooting
float dp, ppp; //Ray parameter and |pl/lp'| of last overshooting
float t = 0.0001f;
while(t < 1 && !(overshoot and undershoot)) {
    float d = a * t / (1 - t);
    float3 r = x + R * d;
    float ra = texCUBElod(map, float4(r,0)). a;
    if (ra > 0) {
       float rrp = length(r)/ra;
       if (rpp < 1) { dl
          = d; 1pp =
          rrp;
          undershoot = true;
```

-continued

```
        } else {
            dp = d;
            PPP = rrP;
            overshoot = true;
        }
    } else {
        undershoot = false;
        overshoot = false;
    }
    t += Dt;
}
```

The search algorithm finds a pair of undershooting and overshooting values of d in a layer of a cube map, making uniform steps Dt in texture space along the ray. Step size Dt can be set based on the length of line segment s-e and the texel resolution of the cube map. At a given texel, the distance can be obtained from the alpha channel of the cube map. This linear search can be run for each layer of the cube map. The layer where the dp parameter is minimal contains the first hit of the ray.

In some implementations, the linear search can be accelerated by determining minimum and maximum distance values (d) that bound the search space. When a ray is traced, it is intersected with spheres centered at the reference point (o) and having radii equal to the minimum and maximum distance values in the layer of the cube map. These two intersection points may reduce the ray space that needs to be searched and reduces the length of the line segment s-e to allow for fewer search steps with the same accuracy.

With the undershooting and overshooting distance values (dl, dp), a secant search can be used to determine the intersection. The secant search assumes that the surface is planar between the texel map distances of the overshooting and undershooting points. With this assumption, a line between P and p' is intersected by the ray at a point r=x+R*dn, where $$dn = dl + (dp - dl) * (1 - |l|/|l'|)/(|p|/|p'| - |l|/|l'|).$$

If a single secant step does not provide accurate results, dn can replace dp or dl (always keeping one of the overshooting or undershooting approximations) and proceed to iteratively compute dn again. The following fragment shader code illustrates an example secant search implementation.

```
for (int I = 0; I < NITER; i++) {
    dn = dl + (dp - dl) * (1-lpp)/ppp-lpp);
    float3 r = x + r * dn;
    float rrp = length(r) / texCUBElod(map, float4(r,0)).a;
    if (rrp < 0.999) {
        lpp = rrp;
        dl = dn;
    } else if (rrp > 1.0001) {
        PPP = rrp;
        dp = dn;
    } else i = NITER;
}
```

The linear search algorithm that processes every layer of the cube map, and the secant search that processes a single layer, can be incorporated into a function—a HIT( ) function providing a tool that can trace a ray from an arbitrary spatial location within a scene defined by a cube map.

B.2. Video Frame Rendering

The following code segment illustrates fragment shader pseudo code that can be used to render an arbitrary video frame from layers of cube map samplers with depth information.

```
// in this simple example, a cube mesh, centered at the camera origin, is passed into the pixel shader for rasterization
// The VSDO is represented by a cubemap array, which is tied to the SceneID
// The ViewPort1D is used to lookup Frame-specific data for the Frame being rendered using this function (i.e. position, FOV etc).
// result is the output fragment data to be written to the render target
function backdrop(int SceneID, int ViewPort1D)
{
    // the view vector can be calculated by getting a normal to the vertex position of a skybox passed from the vertex shader
    // or it can calculated completely in the pixel shader for the screen space fragment with a view transform set in a constant buffer and indexed with ViewPort1D
    float3 ViewDir=normalize(vertexpos.xzy);
    // CubeMapArray is an array of Cubic Environment maps, with depth information
    // camerapos[ViewPort1D] a float3 constant buffer entry storing the viewport's position in world space
    // probepos is a float3 constant buffer entry storing the world space origin of the cubic environment/depth map being tested for a ray intersection
    // Hit(float3 pos,float3 ray, inout int Layer1D) is a function that performs raycasting on all loaded depth cube map samplers using the ray intersection system described
    // The Hit( ) function's 3rd parameter is an inout value that is set to the cube map ID where that the ray intersects by the Hit( ) function after testing is done on all depth layers in the cube map array
    // the Layer1D can index a cube map array, which along the HitPoint return value, can lookup the proper fragment to render for this video frame
    int Layer1D;
    float3 HitPoint = Hit(camerapos[ViewPortID]-probepos[SceneID],ViewDir,LayerID)
    result=texCUBE(CubeMapArray[LayerID],HitPoint);
}
```

B.3. Overview—Creating A Viewport State Data Object

The rendering methods described herein can reduce the bandwidth resources, and associated processing time, required for rendering novel frames of a video sequence after a VSDO encompassing the novel viewport's elements has been transmitted. Furthermore, while a centralized server farm could include one video server for every connected client (such as a gaming client), thus ensuring that each client has a dedicated graphics device for remotely rendering a video frame, this would be inefficient compared to a client side-rendering model where a single video or gaming server could handle many hundreds of users at once, due to the low complexity of processing and transmitting state information and render instruction packets (i.e., object position, velocity, etc.) for VSDOs that have already been transmitted to the user. The complexity of rendering a video frame is orders of magnitude more complex than processing state information, and thus, a render server that would perform brute force rendering naively for each video frame would require disproportionately more processing power per user than a state-based server model.

As discussed above, viewport state data object (VSDO) contains layers of scene information arranged in a layered cubic map that are generated from an arbitrary reference point in a 3D scene. A cubic map is a projection of an environment, including one or more objects located therein, on a cube. A cubic map can be rendered for a given environment by placing a camera in the center of the cube and rendering six rasters, one for each face of the cube. The viewport state data object layers can be efficiently generated on a GPU. In other words, GPUs have facilities that generate viewport state data objects given information regarding the objects in a scene and a reference point. A 3D scene, each time it is significantly changed, can be rendered into a series of cubic environment maps, or a single cubic environment map set, if multi-element cube maps are supported by the graphics processor unit. One GPU can be utilized to render the cubic maps. In other implementations, multiple GPUs can be used to separately render a face of a cubic map into a commonly accessible memory space to accelerate generation of the VSDO.

The multiple layer elements of the rendered output include: depth information and color information, and, for relighting and deferred shading purposes, may optionally contain per fragment surface normals, UV texture coordinates, material properties and high dynamic range lighting information. If the VSDO being generated is intended to allow video frames to be created from different spatial reference positions, then the scene is rendered using depth peeling. These additional cube maps (depth layer sets) also comprise the elements described above, and are generated for each additional depth layer that is required to re-render overlapping elements within the radial clipping plane range of the viewport state date object (defined as the far clipping plane of the camera used to generate the VSDO).

Static and dynamic objects in a scene can further be separated into additional layers, so that static scene elements can be cached in one set of cube map-based VSDOs, and dynamic scene elements can be updated in another set of cube maps of the VSDOs described above, enabling even better compression performance when VSDOs corresponding to static scene elements are cached and combined with VSDOs containing dynamic scene elements. For example, a VSDO for a dynamic object can be transmitted as a reference VSDO with information regarding where it is located and oriented within a static scene modeled by another VSDO. A single VSDO can also be used to create multiple instances of an object within a scene (such as a single VSDO being used to render multiple fighter planes within a scene).

Still further, a VSDO for a dynamic object can be transmitted as a reference VSDO. Subsequently, differencing data (such as some form of delta encoding) describing how to change the reference VSDO prior to rendering of a subject video frame to express movement of the object can be transmitted to the video render client instead of entirely new VSDO for even better compression. For example, a video render client may receive a first reference VSDO for a dynamic object and difference or delta data describing how to change the reference VSDO for rendering of one or more frames of a video sequence. The difference data can characterize the changes to the texels in the layered cube maps of the reference VSDO.

In one implementation, in order to render a video frame, a video render client performs rendering operations on the static and dynamic VSDOs associated with the frame and executes depth sorting on each pixel to selected the closest depth pixel, relative to the reference point for the rendered frame, resulting from the VSDO render operations.

Other optimizations and configurations are possible. The faces of the cube map layers can further be turned into 2D longitude-latitude maps using the process illustrated in the pseudo code section set forth above and packed into standard 2D based representations which can further be sent as compressed video streams using a video codec designed for compressing 2D temporal video data. At the client side, the rendering client can construct the VSDOs from the 2D images by stitching the individual maps into cubes.

VSDOs can also contain partial scene representations (partial Viewport State Data Object) versus a full 360-degree panoramic dataset in a complete VSDO. Partial VSDOs can include top down or isometric tiles of a scene, which a thin render client can subsequently use to scroll in 2D, without requiring the more complex image decoding of a complete VSDO. For example, the cube map VSDO layers can be transformed into 2D packed VSDOs (for example, a longitude latitude map, parabolic map set, helix map) to facilitate storage and transmission of the VSDO in 2D image formats. Sequences of complete VSDOs generated in linear or grid-based spatial sets can further be stacked together into a volumetric texture (for single sampler access within a GPU shader) and also compressed as a sequence of grouped frames through standard 2D video codec techniques.

If a viewport state data object is stored in a 2D format (as described above), the data contained therein can either be converted back into a cube map for efficient rendering on a GPU, or the data can be accessed directly in the rendering routines described below. This can be done through pixel shader operations that map 3D cube map texture lookups into 2D texture coordinate lookups, using the inverse transform that encoded the VSDO cube map layer into a 2D raster (see following pseudocode segment).

Fragment shader pseudo code to turn a cube map into longitude/latitude map//uv is (x,y) uv coordinate of pixel being rendered into a 2D target.

```
// CubeMap is cube map texture sampler being converted into a 2D longitude/latitude map // result is
the output fragment data to be written to the render target
function CubicMapto2DMAP(float2 uv, sampler CubeMap)
{
    float rx=radians(180*(uv.x-.5)*2);
    float ry=radians(-180*(uv.y-.5));
    float3 R; // the 3 coordinate lookup vector for the CubeMap being converted R.x=sin(-
    rx)*cos(ry);
    R.z=cos(-rx)*cos(ry);
```

```
R. y=s in(ry);
result=texCUBE(CubeMap,R);
```

C. Example Video Compression Processes

Figure 3A:
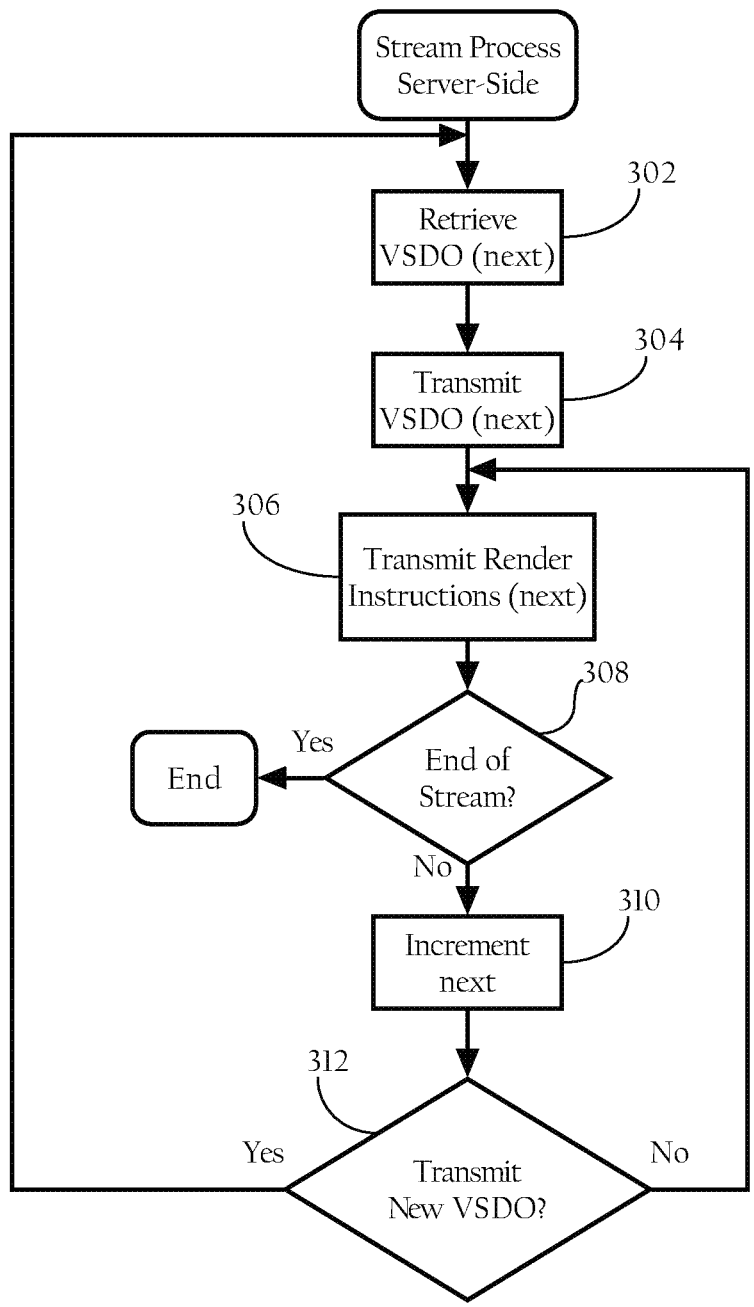

FIGS. 3A and 3B illustrate example process flows directed to a video compression system where a video server provides one or more VSDOs and render instructions to video render clients, which create a sequence of video frames based on the VSDOs and the render instructions. As the video progresses, a video render client can generate video frames by changing spatial position or view transform parameters, adding or removing VSDOs, modifying objects, and the like, and re-rendering the VSDOs to generate video frames.

FIG. 3A illustrates an example process that a video server can implement to transmit compressed video in a stream. As a video stream is transmitted, a video server retrieves one or more VSDOs (302) for a video sequence and transmits the VSDO (compressed or uncompressed, as discussed above) to a video render client (304). The video server also transmits render instructions to the video client (306). The render instructions may be transmitted in a series of packets, each of which corresponding to an identified sequence of video frames. As FIG. 3A illustrates, the video server, as the video stream progresses, increments one or more video state variables to identify the next set of render instructions and/or VSDOs to transmit (310, 312, 306). The video server loops through this decisional logic until the end of the stream (308) or termination/pausing of the streaming session. A similar process can be applied in an interactive gaming context, where the video server generates render instructions and new VSDOs in response to inputs from one or more remote hosts that may be within the virtual environment.

FIG. 3B illustrates a process that can be implemented to render the compressed video stream transmitted by the video server. It should be noted that the same or similar process can be applied to a video file that was transmitted as a bulk download (or embodied in an optical or other storage medium) and stored on a local storage device. In a particular implementation, one or more VSDOs and associated render instructions may be buffered in memory. For example, the VSDOs may be buffered in a GPU or system memory, while the render instructions may be buffered in system or GPU memory. A video render process may access the VSDO(s) (362) and render instructions (360), and render one or more video frames according to the render instructions (364). As FIG. 3B illustrates, the video render process may retrieve additional render instructions (366, 360) to continue processing and rendering of the video. Still further, the video render process may also load new VSDOs and modify existing VSDOs (370, 372) to continue processing of the video stream.

C.1. Rendering Processes

The complete VSDO(s) can be rendered in two ways to create video frames, without requiring further complex rasterization of scene geometry. The choice between rendering methods depends on the relation between the center or reference point of the VSDO(s) and the spatial position or location of a given video frame.

C.1.a. Render Method 1: Novel Frame Orientation

This method treats a VSDO as a cubic environment map (e.g., a sky box), centered about a novel video frame world space and view origin. This method allows efficient re-rendering of the video frame using any arbitrary orientation (e.g., pitch, yaw, roll). In a scene with complex geometry, reducing the re-rendering process to a rasterization of a panoramic environment can therefore dramatically increase the speed by orders of magnitude versus performing a complete re-render of the entire scene for each frame, and transmitting this rendered data to a video client. This method can be used in cases where the video frame spatial reference position is approximately the same as the VSDO's capture radius center (reference point), and only the viewport's orientation (yaw, pitch, roll) and perspective transform need to be changed to create or render the viewports. According to this render method, a simple skybox cube model is centered at the novel viewport's origin. A video render client, using the facilities of a GPU, attaches one or more VSDOs to a fragment or pixel shader as available inputs for the render pass. A pixel or fragment shader is a GPU resource that renders or shades pixels in a memory map in a fast, parallel processing operation. Depending on the capabilities and configuration of the GPU, multiple VSDOs may be mapped to a pixel shader, or the mapping may be a one-to-one relationship. Each frame is rendered from its unique orientation and perspective parameters. In a particular implementation, the skybox pixel shader samples the VSDO using the view vector from the origin to render the VSDO as a panoramic environment.

C.2. Render Method 2: Novel Position and Orientation

Render method 2 expands the subset of video frames generated using render method 1 to include video frames that are generated from any arbitrary 3D spatial position (in addition to orientation and perspective) within the VSDO's capture radius. Additional VSDO nodes can be dynamically linked together as additional sampler stages at render time in order to enable the video render process to rasterize elements outside of the bounds of a single VSDO capture radius. The method applies the parallel pixel shader processing power of a GPU to perform ray intersections tests on a VSDO, using the VSDO's depth layers to generate a novel viewport from any point within the bounds of the VSDO's capture radius.

According to render method 2, the spatial and view transform are set (i.e., as shader constants if performing the rendering on a GPU) according to render instructions. As above in Render Method 1, the depth and render layers of each VSDO required to render the video frame are prepared for rendering (i.e. loaded as texture samplers on a GPU), and a skybox mesh can be prepared as a dummy environment map as described in render method 1 and centered at the novel viewport's local rendering origin as in render method 1.

The video frame is rasterized from the requested spatial and view transform using the following fragment operation: Each fragment performs a ray traced hit test (see first pixel shader pseudocode section, above) on all VSDOs loaded in to the GPU for the frame, using the spatial position set as the origin of the ray, and the ray's direction vector set to the match the view transform parameters. The ray hit test algorithm (see Section B.1., above), returns hit point and VSDO fragment layer information. Furthermore, in one possible optimization, depth information from a previously generated and cached VSDO of the scene's static elements can be used to merge these static scene elements with the new VSDO by including the cached VSDO. Overlapped elements can be processed and sorted correctly. If the ray-traced VSDO fragment contains intermediate render state data (normal maps, diffuse, specular, Fresnel, UV, material ID and other render elements) then deferred shading can be performed on these elements to produce a completely rendered fragment. The final processed fragment generated is rendered into screen space in a render buffer.

Particular embodiments of the above-described process might be comprised of instructions that are stored on storage media. The instructions might be retrieved and executed by a processing system. The instructions are operative when executed by the processing system to direct the processing system to operate in accord with the present invention. Some examples of instructions are software, program code, firmware, and microcode. Some examples of storage media are memory devices, tape, disks, integrated circuits, and servers. The term "processing system" refers to a single processing device or a group of inter-operational processing devices. Some examples of processing devices are integrated circuits and logic circuitry. Those skilled in the art are familiar with instructions, storage media, and processing systems.

Those skilled in the art will appreciate variations of the above-described embodiments that fall within the scope of the invention. In this regard, it will be appreciated that there are many possible orderings of the steps in the process described above and many possible modularizations of those orderings. While the foregoing describes rendering of 3D scenes onto traditional 2D video frames, the video compression scheme described above can be applied to transmit render assets and instructions to 3D display rendering clients, such as stereoscopic video render clients, holographic render clients, and high dynamic range displays. In addition, although the embodiments describe above operate in connection with layered cube maps, other data structures for storing texel information, such as spherical maps, can be used. Still further, the render assets and instructions can be embodied on a physical storage media, such as an optical disc, and rendered by a suitably configured media player executing on a general purpose or special purpose computing device. In addition, while the embodiments discussed above are described as operating in connection with cubic maps, the invention can be used to operate in connection with any arbitrarily configured data structure that contains voxelized or per-pixel spatial information associated with the objects of a scene. As a result, the invention is not limited to the specific examples and illustrations discussed above, but only by the following claims and their equivalents.

What is claimed is:

1. A method comprising:
    receiving, by a processor, a video stream from a network;
    retrieving, by the processor, one or more viewport state data objects (VSDOs) from the video stream;
    transmitting, by the processor, the one or more VSDOs to a client host;
    transmitting, by the processor, to the client host, a message comprising a set of render instructions corresponding to the one or more VSDOs;
    identifying, by the processor, based on one or more video state variables as the video stream progresses, a next set of render instructions and the one or more VSDOs to transmit to the client host;
    determining, by the processor, whether the process is at the end of the video stream;
    upon determining that the process is not at the end of the video stream, repeating, by the processor, the receiving, retrieving, transmitting the one or more VSDOs, transmitting the message, and identifying steps; and
    upon determining that the process is at the end of the video stream, terminating, by the processor, the process.

2. The method of claim 1, wherein the message comprising the set of render instructions is transmitted in a series of packets, each of which corresponding to a sequence of video frames.

3. The method of claim 1, further comprising:
    generating, by the processor comprised in the remote host, the one or more VSDOs comprising layers of scene information corresponding to a plurality of video frames.

4. The method of claim 1, further comprising:
    generating, by the processor, the message comprising the set of render instructions comprising one or more VSDO identifiers identifying the one or more VSDOs.

5. The method of claim 4, wherein generating the message further comprises generating, for a video frame of a sequence of video frames, a spatial location defining a reference point from which the video frame is to be rendered using the one or more VSDOs.

6. The method of claim 1, wherein the transmitted one or more VSDOs and the transmitted message are buffered in at least one of a GPU memory and a system memory.

7. A method comprising:
    receiving, by a processor, one or more VSDOs from a video stream;
    receiving, by the processor, a message comprising a set of render instructions corresponding to the one or more VSDOs;
    rendering, by the processor, the video stream based on the received one or more VSDOs and the received message comprising the set of render instructions;
    determining, by the processor, whether the process is at the end of the video stream;
    upon determining that the process is not at the end of the video stream, repeating, by the processor, the receiving the one or more VSDOs, receiving the message, and rendering steps; and
    upon determining that the process is at the end of the video stream, terminating, by the processor, the process.

8. The method of claim 7, further comprising:
    creating, by the processor, a sequence of video frames based on the transmitted one or more VSDOs and the transmitted message comprising the set of render instructions.

9. The method of claim 8, wherein creating the sequence of video frames comprises one or more of changing spatial position or view transform parameters, adding or removing the one or more VSDOs, modifying the one or more VSDOs, and re-rendering the one or more VSDOs.

10. The method of claim 7, wherein rendering the video stream comprises choosing a rendering method based on a relation between reference points of the one or more VSDO(s) and a defined spatial position of a given video frame.

11. A non-transitory computer readable storage medium comprising instructions for:
    receiving a video stream;
    retrieving one or more viewport state data objects (VSDOs) from the video stream;
    transmitting the one or more VSDOs to a client host;
    transmitting to the client host, a message comprising a set of render instructions corresponding to the one or more VSDOs;

identifying based on one or more video state variables as the video stream progresses, a next set of render instructions and the one or more VSDOs to transmit to the client host;

determining whether the process is at the end of the video stream;

upon determining that the process is not at the end of the video stream, repeating the receiving, retrieving, transmitting the one or more VSDOs, transmitting the message, and identifying steps; and upon determining that the process is at the end of the video stream, terminating the process.

12. The non-transitory medium of claim 11, further comprising instructions for:

generating the one or more VSDOs comprising layers of scene information corresponding to a plurality of video frames.

13. The non-transitory medium of claim 11, further comprising instructions for:

generating the message comprising the set of render instructions comprising one or more VSDO identifiers identifying the one or more VSDOs.

14. The non-transitory medium of claim 13, wherein generating the message further comprises generating, for a video frame of a sequence of video frames, a spatial location defining a reference point from which the video frame is to be rendered using the one or more VSDOs.

15. The non-transitory medium of claim 11, wherein the transmitted one or more VSDOs and the transmitted message are buffered in at least one of a GPU memory and a system memory.

16. A non-transitory computer readable storage medium comprising instructions for:

receiving, by a processor, one or more VSDOs from a video stream from a network;

receiving, by the processor, a message comprising a set of render instructions corresponding to the one or more VSDOs;

rendering, by the processor, the video stream based on the received one or more VSDOs and the received message comprising the set of render instructions;

determining, by the processor, whether the process is at the end of the video stream;

upon determining that the process is not at the end of the video stream, repeating, by the processor, the receiving the one or more VSDOs, receiving the message, and rendering steps; and upon determining that the process is at the end of the video stream, terminating the process.

17. The non-transitory medium of claim 16, further comprising instructions for:

creating a sequence of video frames based on the transmitted one or more VSDOs and the transmitted message comprising the set of render instructions.

18. The non-transitory medium of claim 16, wherein rendering the video stream comprising choosing a rendering method based on a relation between reference points of the one or more VSDO(s) and a defined spatial position of a given video frame.

19. A computing apparatus comprising:

one or more processors;

a non-transitory storage medium comprising processor-executable instructions for:

receiving a video stream from a network;

retrieving one or more viewport state data objects (VSDOs) from the video stream;

transmitting the one or more VSDOs to a client host;

transmitting to the client host, a message comprising a set of render instructions corresponding to the one or more VSDOs;

identifying based on one or more video state variables as the video stream progresses, a next set of render instructions and the one or more VSDOs to transmit to the client host;

determining whether the process is at the end of the video stream;

upon determining that the process is not at the end of the video stream, repeating the receiving, retrieving, transmitting the one or more VSDOs, transmitting the message, and identifying steps; and upon determining that the process is at the end of the video stream, terminating the process.

20. The apparatus of claim 19, further comprising instructions for:

generating the one or more VSDOs comprising layers of scene information corresponding to a plurality of video frames.

21. The apparatus of claim 19, further comprising instructions for:

generating the message comprising the set of render instructions comprising one or more VSDO identifiers identifying the one or more VSDOs.

* * * * *